United States Patent
Lown

(10) Patent No.: US 10,206,411 B2
(45) Date of Patent: Feb. 19, 2019

(54) APPARATUS FOR PREPARING A BREWED DRINK

(71) Applicant: Takeya USA Corporation, Huntington Beach, CA (US)

(72) Inventor: John M. Lown, Huntington Beach, CA (US)

(73) Assignee: Takeya USA Corporation, Huntington Beach, CA (US)

( * ) Notice: Subject to any disclaimer, the term of this patent is extended or adjusted under 35 U.S.C. 154(b) by 0 days.

(21) Appl. No.: 15/411,881

(22) Filed: Jan. 20, 2017

(65) Prior Publication Data

US 2017/0127696 A1    May 11, 2017

Related U.S. Application Data

(63) Continuation of application No. 14/318,268, filed on Jun. 27, 2014, now Pat. No. 9,629,379, which is a continuation of application No. 13/041,117, filed on Mar. 4, 2011, now Pat. No. 8,778,432.

(51) Int. Cl.
| | |
|---|---|
| *A23F 3/18* | (2006.01) |
| *A47J 31/06* | (2006.01) |
| *A23F 3/00* | (2006.01) |

(52) U.S. Cl.
CPC .................. *A23F 3/18* (2013.01); *A23F 3/00* (2013.01); *A47J 31/06* (2013.01)

(58) Field of Classification Search
CPC ..................................... A23F 3/18; A47J 31/06
See application file for complete search history.

(56) References Cited

U.S. PATENT DOCUMENTS

| | | | |
|---|---|---|---|
| 2,055,096 | A | 9/1936 | Dehn et al. |
| D102,574 | S | 12/1936 | Nelson |
| D110,140 | S | 6/1938 | Gamble |
| D121,154 | S | 6/1940 | Bernhardt |
| 2,257,944 | A | 10/1941 | Fischbein |
| D157,795 | S | 3/1950 | Schwarz |

(Continued)

FOREIGN PATENT DOCUMENTS

| | | |
|---|---|---|
| CN | 201398776 | 2/2010 |
| CN | 201658143 | 12/2010 |

(Continued)

OTHER PUBLICATIONS

International Search Report and Written Opinion on corresponding PCT application (PCT/US2012/027695) from International Searching Authority (KIPO) dated Oct. 19, 2012.

(Continued)

*Primary Examiner* — Anthony J Weier
(74) *Attorney, Agent, or Firm* — Klein, O'Neill & Singh, LLP

(57) ABSTRACT

A method and apparatus for brewing and chilling a brewed beverage such as tea includes brewing the beverage; combining the brewed beverage with a chilling medium; and covering the combined brewed beverage and chilling medium with an air-tight lid assembly to form an airtight seal. The combined brewed beverage and chilling medium may then be agitated. The airtight seal traps vapor generated from the beverage during the chilling, thereby causing the vapor to re-enter the beverage to maintain optimum flavor.

41 Claims, 6 Drawing Sheets

(56) References Cited

U.S. PATENT DOCUMENTS

| | | | |
|---|---|---|---|
| 2,505,305 A | 4/1950 | Schaefer | |
| 2,592,485 A * | 4/1952 | Stair | A47J 43/27 220/568 |
| 3,181,951 A | 5/1965 | Gronvold | |
| D203,211 S | 12/1965 | Brocken et al. | |
| 3,463,947 A | 8/1969 | Taylor | |
| D216,370 S | 12/1969 | Tsoo-Hing et al. | |
| 3,844,450 A | 10/1974 | Johnson | |
| 4,276,992 A | 7/1981 | Susich | |
| D264,926 S | 6/1982 | McClelland | |
| 4,381,696 A | 5/1983 | Koral | |
| 4,473,470 A | 9/1984 | Loutit | |
| 4,487,114 A | 12/1984 | Abdenour | |
| 4,492,323 A | 1/1985 | Essen | |
| D286,967 S | 12/1986 | Appel | |
| D301,296 S | 5/1989 | Hsu | |
| D302,370 S | 7/1989 | Gibert | |
| D306,547 S | 3/1990 | Wolfenden | |
| D308,460 S | 6/1990 | Balzano | |
| D313,726 S | 1/1991 | Scherer | |
| D316,206 S | 4/1991 | Daenen et al. | |
| D319,368 S | 8/1991 | Picozza et al. | |
| D320,350 S | 10/1991 | Fabiano | |
| D321,301 S | 11/1991 | Purkapile | |
| D325,687 S | 4/1992 | Embree | |
| 5,102,546 A | 4/1992 | Salomon | |
| D338,367 S | 8/1993 | Fonville | |
| 5,231,918 A | 8/1993 | Grzywna | |
| 5,318,791 A | 6/1994 | Millman et al. | |
| 5,363,745 A | 11/1994 | Lin | |
| 5,477,979 A | 12/1995 | Goessling et al. | |
| 5,531,353 A | 7/1996 | Ward et al. | |
| 5,613,616 A | 3/1997 | Monus | |
| 5,678,472 A | 10/1997 | Millman | |
| 5,680,951 A | 10/1997 | Feltman, III et al. | |
| 5,711,207 A | 1/1998 | Wu | |
| 5,738,786 A | 4/1998 | Winnington-Ingram | |
| 5,855,160 A | 1/1999 | Shen | |
| 5,862,739 A | 1/1999 | Lin | |
| D406,011 S | 2/1999 | Hatsumoto et al. | |
| 5,913,961 A | 6/1999 | Chmiel et al. | |
| 5,913,964 A | 6/1999 | Melton | |
| 5,943,946 A | 8/1999 | Chen | |
| 5,947,004 A | 9/1999 | Huang | |
| D427,846 S | 7/2000 | Hajwanie | |
| 6,095,033 A | 8/2000 | Melton | |
| 6,202,542 B1 | 3/2001 | Melton | |
| 6,231,226 B1 | 5/2001 | Neidigh | |
| D446,681 S | 8/2001 | Weibel | |
| 6,269,736 B1 | 8/2001 | Melton | |
| 6,276,262 B1 | 8/2001 | Chen | |
| D450,106 S | 11/2001 | Herr | |
| 6,314,866 B1 | 11/2001 | Melton | |
| 6,372,270 B1 | 4/2002 | Denny | |
| RE37,773 E | 7/2002 | Trombley | |
| 6,442,961 B1 | 9/2002 | Rosenberg et al. | |
| D473,092 S | 4/2003 | Heiberg et al. | |
| 6,561,080 B1 * | 5/2003 | Feeney | A47J 31/24 99/295 |
| 6,578,726 B1 | 6/2003 | Schaefer | |
| D484,743 S | 1/2004 | Furlong | |
| D490,266 S | 5/2004 | Imai | |
| 6,742,442 B1 | 6/2004 | Su | |
| 6,752,287 B1 | 6/2004 | Lin | |
| 6,758,363 B2 | 7/2004 | Stokes | |
| 6,763,964 B1 | 7/2004 | Hurlbut et al. | |
| D495,458 S | 8/2004 | Baldinger et al. | |
| 6,871,914 B2 | 3/2005 | Stewart, Jr. | |
| D511,684 S | 11/2005 | Guyot | |
| 7,032,507 B2 | 4/2006 | Cai | |
| D524,599 S | 7/2006 | Bodum | |
| D530,590 S | 10/2006 | Singtoroj et al. | |
| 7,219,600 B1 | 5/2007 | Haven et al. | |
| 7,318,374 B2 | 1/2008 | Guerrero | |
| D560,951 S | 2/2008 | Appleton | |
| D563,161 S | 3/2008 | Bodum | |
| D569,324 S | 5/2008 | Gosnell et al. | |
| D569,618 S | 5/2008 | Kirk | |
| D571,145 S | 6/2008 | Rae | |
| D579,717 S | 11/2008 | Pawson et al. | |
| 7,464,368 B2 | 12/2008 | Kothari et al. | |
| 7,464,637 B1 | 12/2008 | Lin | |
| D587,513 S | 3/2009 | Bodum | |
| D587,514 S | 3/2009 | Bodum | |
| D587,957 S | 3/2009 | Imai | |
| D592,123 S | 5/2009 | Cady | |
| D597,396 S | 8/2009 | Menzies | |
| D598,234 S | 8/2009 | Bodum | |
| D602,730 S | 10/2009 | Kino | |
| D613,114 S | 4/2010 | Hewitt | |
| 7,779,751 B2 | 8/2010 | Gilbert | |
| 7,895,939 B2 * | 3/2011 | Pan | A47J 31/005 99/317 |
| D644,072 S | 8/2011 | McDonald et al. | |
| 7,992,487 B1 | 8/2011 | Kahl | |
| 7,997,423 B2 | 8/2011 | Goodman et al. | |
| 8,079,301 B2 | 12/2011 | Birch | |
| 8,221,813 B2 | 7/2012 | Boul | |
| 8,561,834 B2 | 10/2013 | Ziegler | |
| D694,579 S | 12/2013 | Khubani | |
| D699,509 S | 2/2014 | El-Saden et al. | |
| 8,778,432 B2 | 7/2014 | Lown | |
| D717,102 S | 11/2014 | Taketani et al. | |
| 9,039,589 B2 | 5/2015 | Rivera | |
| 2003/0080048 A1 | 5/2003 | Lin | |
| 2003/0221563 A1 | 12/2003 | Lee | |
| 2004/0261631 A1 | 12/2004 | Lee | |
| 2005/0284303 A1 | 12/2005 | Zell et al. | |
| 2006/0185521 A1 | 8/2006 | Publicover et al. | |
| 2007/0089614 A1 | 4/2007 | Tremblay | |
| 2007/0101870 A1 | 5/2007 | Liu et al. | |
| 2008/0173183 A1 | 7/2008 | Chen | |
| 2008/0282900 A1 | 11/2008 | Huang | |
| 2009/0178573 A1 | 7/2009 | Pan | |
| 2010/0263549 A1 | 10/2010 | Lee | |
| 2011/0056386 A1 | 3/2011 | Taketani | |
| 2011/0162532 A1 | 7/2011 | Gilbert | |
| 2011/0204048 A1 * | 8/2011 | Carino | A45F 3/18 220/4.03 |
| 2011/0219956 A1 | 9/2011 | Englert et al. | |
| 2011/0226133 A1 | 9/2011 | Shen | |
| 2011/0265438 A1 | 11/2011 | Ryan | |
| 2012/0225175 A1 | 9/2012 | Lown | |

FOREIGN PATENT DOCUMENTS

| | | |
|---|---|---|
| EP | 2294949 | 11/2014 |
| JP | 59-124273 | 7/1984 |
| JP | 63-088245 | 4/1988 |
| JP | 1-151768 | 10/1989 |
| JP | 8310531 | 11/1996 |
| JP | 11075693 | 3/1999 |
| JP | 11-253312 | 9/1999 |
| JP | 2011-6088 | 1/2011 |
| WO | WO 03/101263 | 12/2003 |

OTHER PUBLICATIONS

English Translation for CN 201398776 published Feb. 10, 2010.
English Translation for CN 20165143 published Dec. 2010.
English Translation for JP 2011006088 published Jan. 13, 2011.
Examiner's Report on corresponding foreign application (EP Application No. 12754478.1) from the European Patent Office dated Mar. 1, 2018.
Examiner's Report on corresponding foreign application (CA Application No. 2934181) from the Canadian Intellectual Patent Office (CIPO) dated Mar. 27, 2018.

* cited by examiner

APPARATUS FOR PREPARING A BREWED DRINK

INCORPORATION BY REFERENCE TO ANY PRIORITY APPLICATIONS

This application is a continuation application of U.S. application Ser. No. 14/318,268, filed on Jun. 27, 2014, now U.S. Pat. No. 9,629,379, which is a continuation of U.S. application Ser. No. 13/041,117, filed Mar. 4, 2011, now U.S. Pat. No. 8,778,432 which is hereby incorporated herein by reference in its entirety and is to be considered a part of this specification. Any and all applications for which a foreign or domestic priority claim is identified in the Application Data Sheet as filed with the present application are hereby incorporated by reference under 37 CFR 1.57.

BACKGROUND

Field of the Invention

The disclosure relates to a method and associated apparatus for making a brewed beverage, such as tea, and for chilling the brewed beverage.

Description of the Related Art

Tea and other steeped beverages are customarily prepared by placing tea leaves in a pot, over which near-boiling water is poured. Typically, it is known to provide screens or strainers, known as infusers, to confine the tea leaves during the brewing cycle.

In general, when making iced tea, the tea generally must be cooled to at least room temperature before adding ice to ensure that the ice does not melt to the extent that the tea is uncontrollably diluted. The preparation of iced tea thus may be a labor and time intensive process.

SUMMARY OF THE INVENTION

In one aspect, a method for chilling tea is provided. The method includes brewing tea within a first container, the first container including an infuser; pouring the brewed tea into a second container containing a chilling medium (e.g., ice); and covering the second container with a first lid assembly that provides an air tight seal to the second container.

Advantageously, covering the second container with an airtight seal locks in the freshness and flavor of the beverage. The airtight seal retains and intensifies the tea aroma and flavor. The second container may be rocked or agitated so as to thoroughly infuse and chill the tea.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features of the present disclosure will now be described with reference to the drawings of illustrated embodiments. The illustrated embodiments are intended to illustrate, but not to limit the disclosure. The drawings include the following Figures.

DETAILED DESCRIPTION

Figure 1:
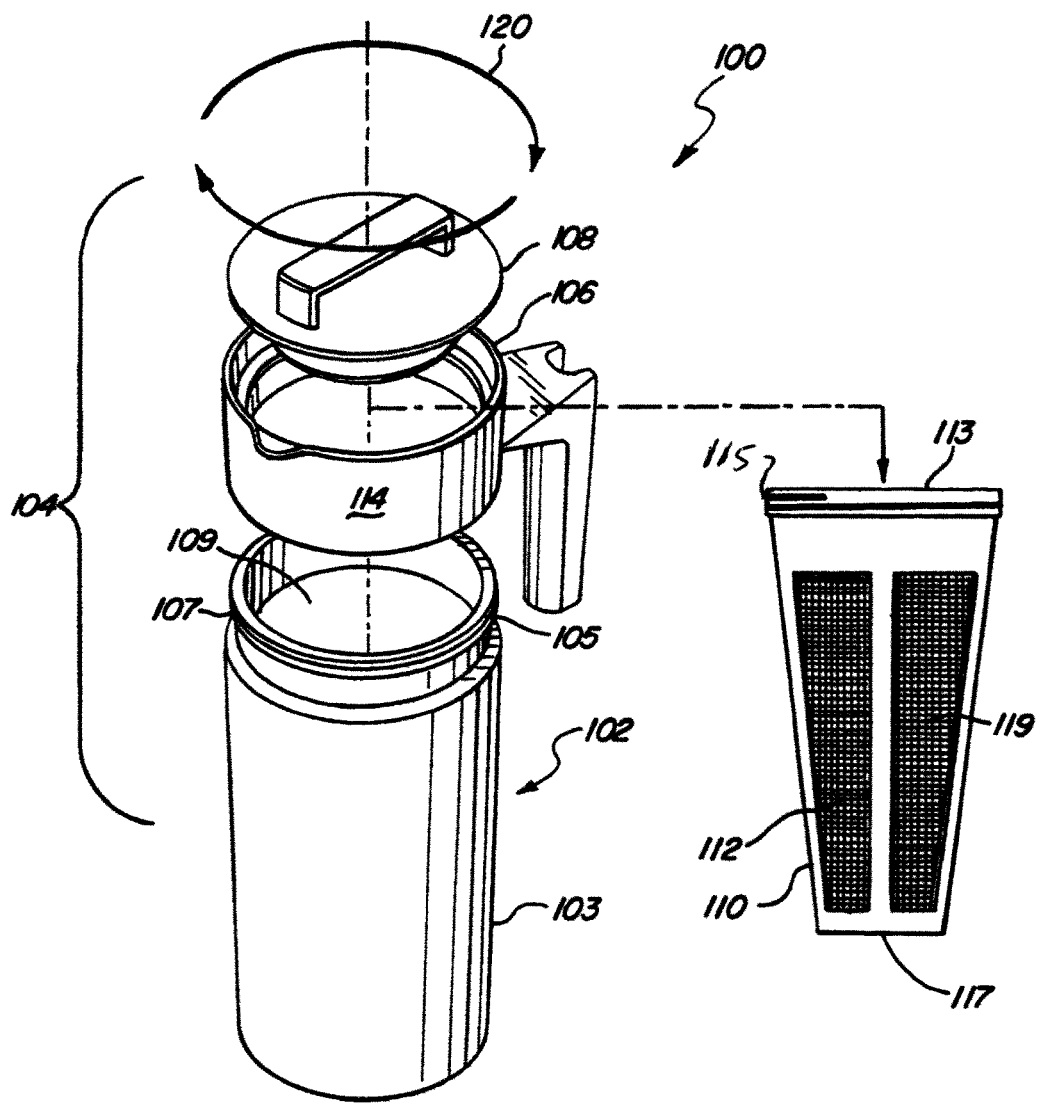
FIG. 1 is an exploded perspective view of a container assembly in accordance with an embodiment.

FIG. 1 is an exploded perspective view of a first or infuser container assembly 100 in accordance with an embodiment. The first container assembly 100 includes a brewing container, such as a pitcher, jug, pot or bottle 102 (hereinafter, "brewing pitcher 102") having a first lid assembly 104 that includes a lid ring 106, a cover 108 and a brew basket or infuser 110.

The brewing pitcher 102 includes a container body 103 that defines a volume used to hold or contain a substance which may be made to flow from the container, for example a liquid or a powder. Though not limited thereto, the container body 103 may have a generally circular, oval or rectangular cross-section that terminates at a continuous upper edge or rim 105. The rim 105 defines an open top portion 109 of the brewing pitcher 102. In some embodiments, the rim may have formed thereon container threads 107 for mounting and securing the brewing pitcher 102 to a lid, for example, reclosable lid or cover 108.

Alternatively, the brewing pitcher may be designed such that the top rim 105 of the pitcher 102 may be force fit into a corresponding portion of the lid assembly 104 designed to receive the rim 105.

In one embodiment, the infuser 110 includes a well 112 that extends from an upper rim 113 downwardly to a bottom wall 117. The well 112 has side walls substantially provided by a porous filter medium 119 (which may be, for example, a metal, fabric, or polymeric mesh or screen), and is generally configured to contain tea leaves, herbal leaves, or other material from which a steeped beverage is brewed. Liquid disposed in the brewing pitcher 102 enters into the well 112 through the filter medium 119. Specifically, hot water poured into the brewing pitcher 102 flows through the filter medium 119 and contacts the material in the well 112 to create the brewed beverage, which then flows out of the well 112 back into the brewing pitcher 102.

Figure 2A:
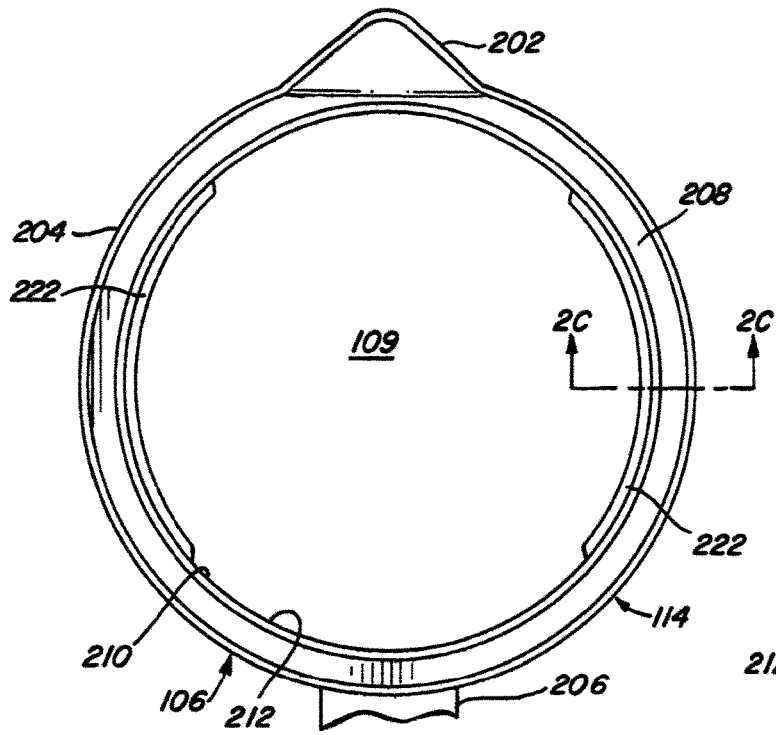
FIGS. 2A and 2B are top and bottom views respectively of a lid ring component of a lid assembly in accordance with an embodiment.
Figure 2C:
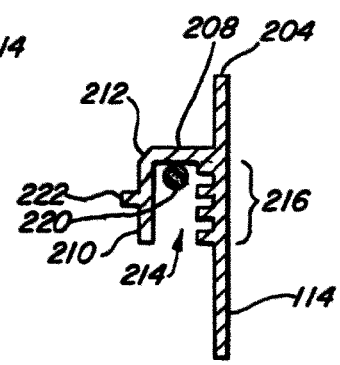
FIG. 2C is a cross-sectional view taken along line 2C-2C of FIG. 2A, in accordance with an embodiment.
Figure 2B:
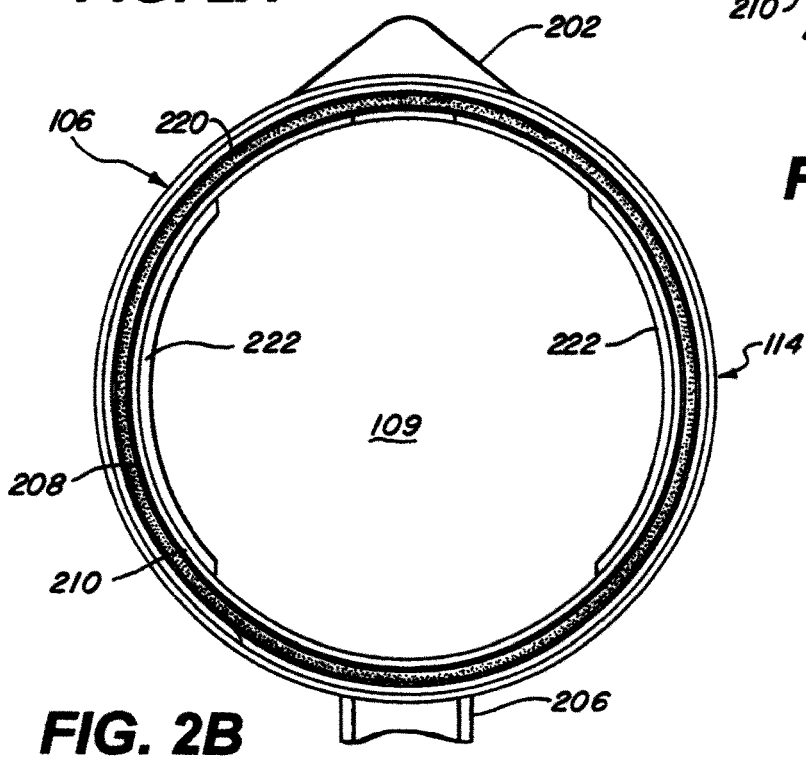

FIGS. 2A and 2B are top and bottom views, respectively, of the lid ring 106 of the lid assembly 104 in accordance with an embodiment. As shown in FIG. 2A, the lid ring 106 includes a generally cylindrical body portion that provides a side wall 114 (FIG. 1) defining a tubular opening. The lid ring 106 provides the primary coupling interface between the brewing pitcher 102 and the lid assembly 104. As shown in FIG. 2A, the lid ring 106 includes a spout 202 formed on a rim 204 on the circumference of the lid ring 106. The spout 202 is diametrically opposed from a handle 206 formed on an external surface of side wall 114.

Referring now to FIGS. 1, 2A, 2B and 2C, the lid ring 106 includes a lip portion 208 that provides a seat for the cover 108 when the cover is secured to the lid ring 106. As shown in FIG. 2C, a flange portion 210 extends perpendicularly down from an internal edge 212 of the lip portion 208. The lip portion 208 and flange portion 210 create a seating area 214 that is formed and configured to receive the rim 105 of the brewing pitcher 102 between the flange portion 210 and an internal surface of the side wall 114. In one embodiment, internal threads 216 may be formed on side wall 114 in the seating area 214 to provide for a threadable engagement with the threads 107 formed on the rim 105 of the brewing pitcher 102 to removably secure the lid ring 106 to the brewing pitcher 102. In one embodiment, a gasket or O-ring 220 may be positioned in the seating area 214 to ensure that the lid ring 106 is sealingly mated to the brewing pitcher 102.

Inward of the seating area 214, the flange portion 210 provides a surface upon which ring threads 222 are formed and positioned to provide a threadable engagement with the cover 108 described below.

Figure 3:
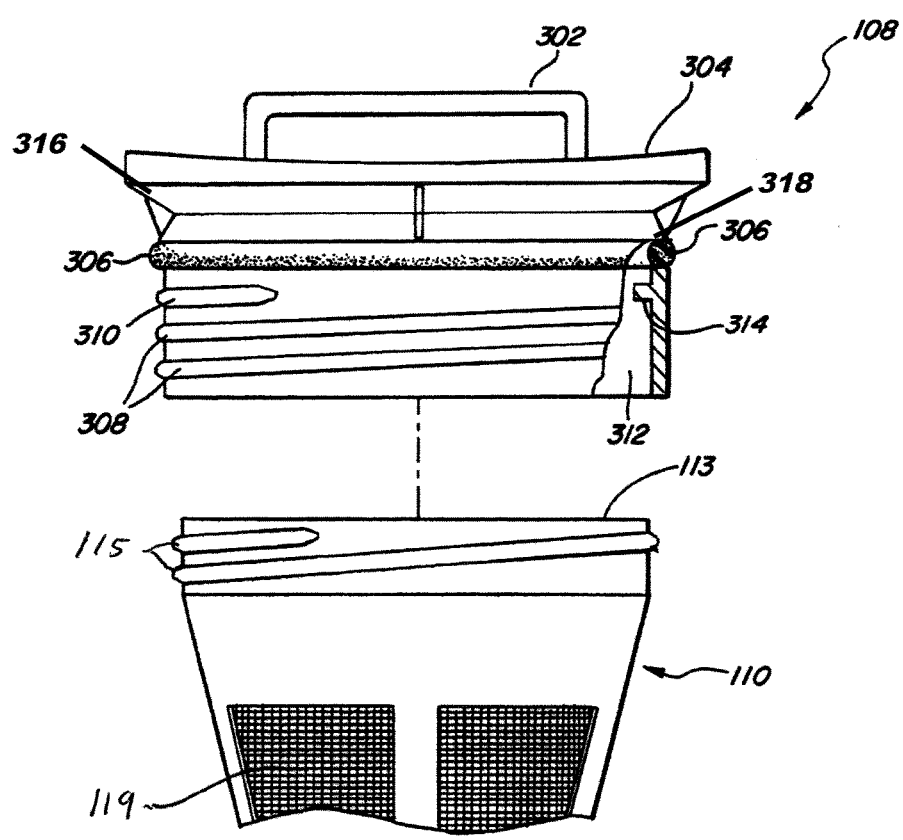
FIG. 3 is an exploded view of a cover that includes a removable infuser in accordance with an embodiment.

FIG. 3 is an exploded view of the cover 108 that includes a removable infuser 110 in accordance with an embodiment. In one embodiment, the cover 108 includes a cover handle 302 on a cover top surface 304, which is part of a top wall 316. The top wall 316 can also include a cover bottom surface 318. In one embodiment, the cover handle 302 resembles a rectangular loop formed on an external surface of the cover. Adjacent and below the cover bottom surface 318 is a groove configured to hold an O-ring type gasket 306. The O-ring gasket 306 provides a positive seal between the cover 108 and the lid ring 106 when the cover 108 is coupled to the lid ring 106.

The cover 108 includes a cover skirt 310, which extends down away from the top surface 304 or top wall 316 on the opposite side from cover handle 302. As shown in the cut-away section in FIG. 3, the cover skirt 310 defines a hollow space 312 configured to receive the infuser 110 as described below.

An external surface of the cover skirt 310 includes a set of external cover threads 308 formed and configured to threadably engage with the ring threads 222 to provide the threadable engagement with cover 108.

Within the hollow space 312 a set of internal cover threads 314 are formed generally adjacent the cover top surface 304 on an internal surface of the cover skirt 310. The internal cover threads 314 provide a means for the cover 108 to engage with corresponding infuser threads 115 provided at the upper rim 113 of the infuser 110. In this manner, the infuser 110 may be removably secured to the cover 108.

Figure 4:
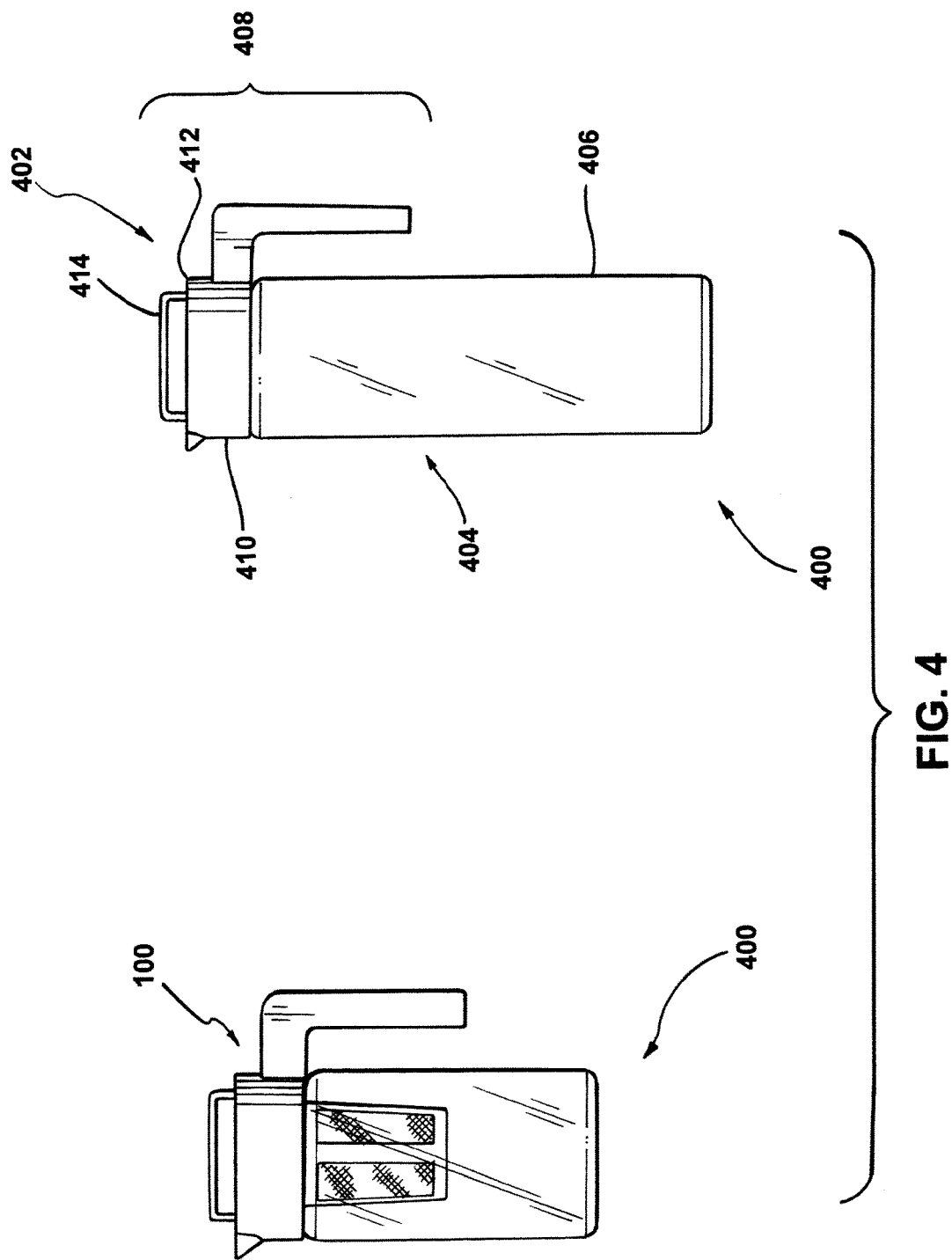
FIG. 4 is side elevational view of beverage brewing and chilling system accordance with an embodiment.

Referring now to FIG. 4, the first or infuser container assembly 100 described above may be used as a component of a tea maker system 400 in accordance with an embodiment of the present invention. In the tea maker system 400, the first or infuser container assembly 100 is combined with a second or chilling container assembly 402 that provides an ability to "chill" the beverage brewed or steeped in the first container assembly 100.

The second container assembly 402 has the same general characteristics as the first container assembly 100, except that it does not include an infuser. For example, the second container assembly 402 may include a chilling pitcher 404 having a body 406 that defines a volume used to hold or contain a substance which may be made to flow from the container body. Though not limited thereto, the container body 406 may have a generally circular, oval or rectangular cross-section that terminates at a continuous upper edge or rim that defines an open top end of the chilling pitcher 404. In some embodiments, the rim may have formed thereon container threads for removably mounting and securing a second lid assembly 408 to the top end of the chilling pitcher 404. The second lid assembly 408 may advantageously be essentially the same as the first lid assembly 108, except that it may omit the above-described structure for removably attaching an infuser. Thus, the second lid assembly 408 includes a second lid ring 410 and a second reclosable lid 412 having a second lid handle 414. The second lid ring 410 may advantageously be essentially identical to the first lid ring 106 described above and illustrated in FIGS. 2A, 2B, and 2C. Therefore the above description of the first lid ring 106 applies to the second lid ring 410 and does not need to be repeated.

In this embodiment, the chilling pitcher 404 is shown having a height and diameter that is different from those of the brewing pitcher 102. Alternatively, the chilling pitcher 404 and the brewing pitcher 102 may have substantially the same dimensions. It should be understood that the chilling pitcher 404 may still maintain the capability to include an infuser, as described above, such that its use with the first or infuser container assembly 100 is interchangeable within the tea maker system 400. In one embodiment, in the tea maker system 400, the first container assembly 100 may provide the ability to brew the tea using the infuser 110, while the second container assembly 402, without the infuser, provides a receptacle in which to chill the tea in the manner described below.

Figure 5:
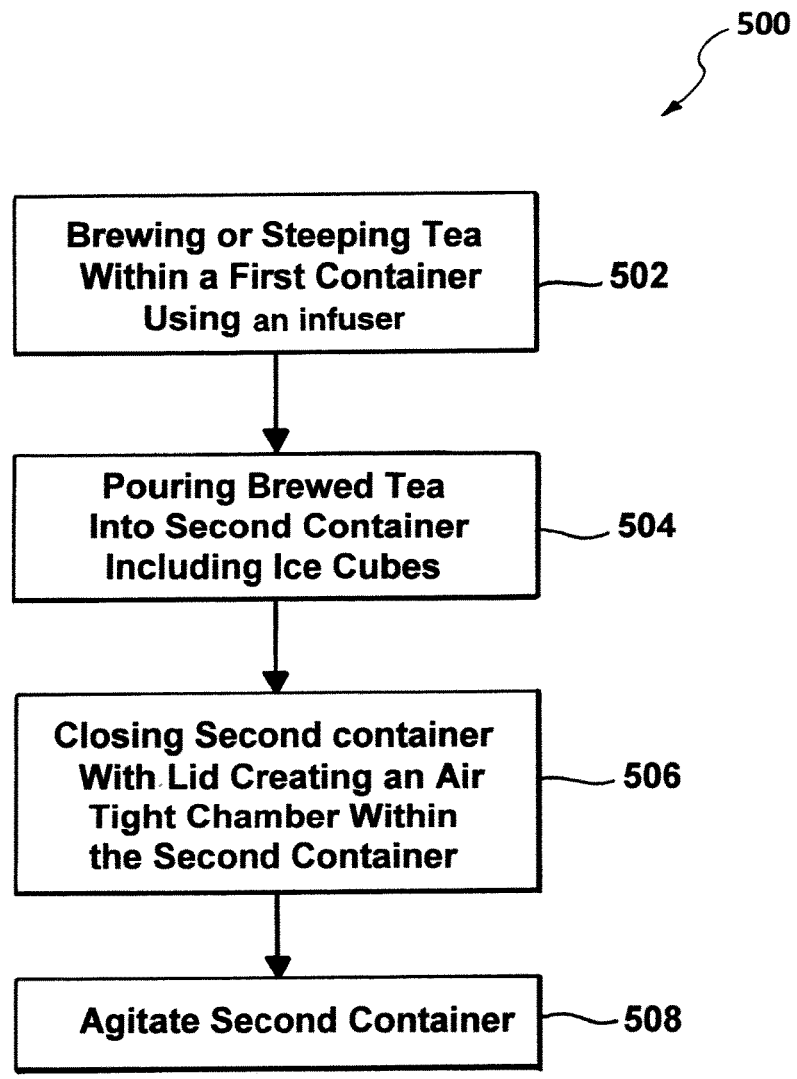
FIG. 5 is a method of brewing and chilling a beverage using the system of FIG. 4 in accordance with an embodiment.

Reference is now made to FIGS. 1-5, where FIG. 5 is a flow chart of a method 500 for preparing and chilling a steeped beverage (e.g., tea) in accordance with an embodiment of the present disclosure.

In operation, a user may assemble the lid assembly 104 of the first container assembly 100 in any desired order. The embodiment now described provides one example for the assembly of the lid assembly 104.

First, the brewing pitcher 102 may be fastened to the lid ring 106 by threading the threads 216 of the lid ring 106 into threads 105 of the brewing pitcher 102.

Next, the infuser 110 is filled with an appropriate amount of tea leaves (not shown) or other herbal material from which the beverage is to be made. (For the sake of simplicity, reference in the following description to "tea leaves" will be understood to include any herbal or organic material from which a beverage may be brewed or steeped.) The infuser 110 is then attached to the cover 108 by threading the infuser 110 onto the internal cover threads 314 in the hollow space 312. The well 112 then extends downwardly from the center of the cover 108.

The combined cover 108 and infuser 110 may be inserted into the brewing pitcher 102 through the open top portion 109 having the lid ring 106 already attached. Generally, when the infuser 110 is inserted into the brewing pitcher 102 filled with liquid, the bottom of the well 112 is immersed below the surface of the liquid. The level of immersion is dependent on the predetermined length of the infuser well and the depth of the liquid. The porous filter medium 119 of the well 112 allows the liquid to circulate through the well 112 and contact any contents (e.g., tea leaves) therein.

Once the infuser 110 containing the tea leaves is positioned within the brewing pitcher 102, hot water from any hot water source is poured into the brewing pitcher 102 to brew or steep the concentrated tea (FIG. 5, step 502).

In one embodiment, the cover 108 may be attached and secured to the lid ring 106 by threading the external cover threads 308 into the ring threads 222. Advantageously, as the cover 108 with the infuser 110 attached is being threaded, the cover and infuser are made to rotate, for example, as represented by arrows 120 in FIG. 1. The rotation may be either clockwise or counter-clockwise depending on whether the cover is being opened or closed. The rotation causes the infuser 110 to rotate while being immersed in the liquid creating an agitation or mixing effect between the contents in the well 112 and the liquid. In this manner rotating the infuser 110 causes liquid to enter and exit the well 112 at a faster rate than when the infuser is not being rotated, which may facilitate or speed-up the steeping or brewing process.

When the cover 108 is less than completely threaded into lid ring 106, the cover is not in a sealed relationship with the lid ring. Thus, liquid from brewing pitcher 102 may be poured out via the spout 202. When the cover 108 is threaded completely onto the lid ring 106, the O-ring 306 is seated onto the lip portion 208, such that no fluid may be poured out from the brewing pitcher 102.

In one example, when a user determines that a steeped beverage has reached a desired strength, the user may remove the cover 108 from the lid ring 106 and thus remove the infuser 110 from the liquid. The user may then remove the infuser 110 from the cover 108. The user may then return the cover 108 to the lid assembly 104 to continue acting as a cover for the beverage in the brewing pitcher 102.

The container body 406 of the chilling pitcher 404 is configured to be partially filled with a chilling medium (typically ice, in the form of ice cubes, crushed ice, shaved ice, or the like), which allows the container body 406 to be used to convert the freshly brewed tea to iced tea. In step 504 (FIG. 5), the freshly brewed tea is poured from the brewing pitcher 102 into the container body 406 of the chilling pitcher 404, which contains the ice. The brewed and concentrated tea may be then mixed with additional water. That is, the container body 406 may be topped off with water.

Figure 6:
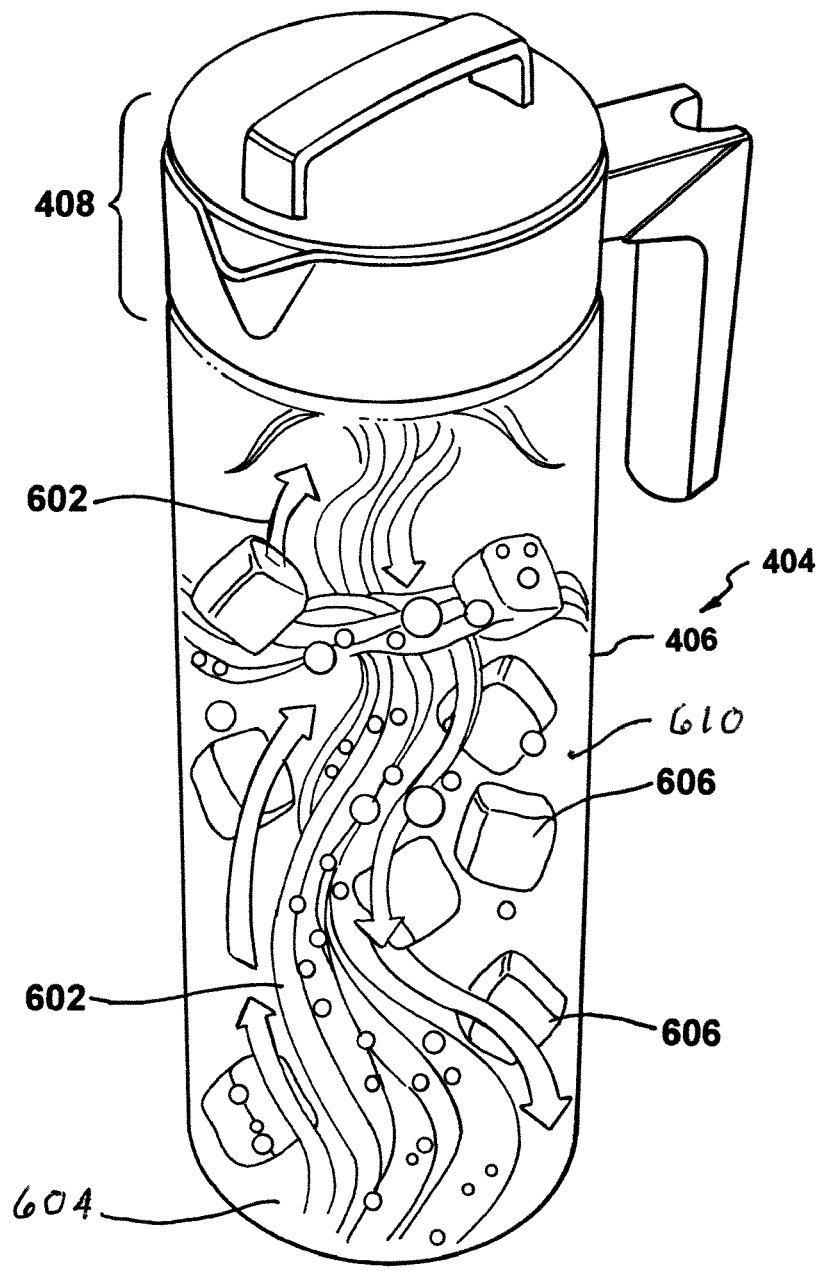
FIG. 6 is a perspective view of the second container of the system of FIG. 4, including a beverage and a chilling medium, in accordance with an embodiment.

Next, in step 506, as shown in FIGS. 5 and 6, the second lid assembly 408 is fastened onto the container body 406 of the chilling pitcher 404. The second lid ring 410 of the second lid assembly 408 engages the rim around the open top end of the chilling pitcher 404 so as create an airtight seal therewith, thereby forming an airtight chamber 610 within the chilling pitcher. This airtight seal is advantageously provided by a gasket or O-ring, such as the gasket 220 shown in FIGS. 2B and 2C, keeping in mind that these figures apply to the second lid ring 410 as well as to the first lid ring 106, as noted above. The airtight seal causes the airtight chamber 610 to trap any water vapor 602 created by the mixture of hot, freshly-brewed tea 604 and ice 606 in the container 406 of the chilling pitcher 404. The vapor created in the airtight chamber 610 is then forced back into the tea 604. The airtight chamber 610 created by sealing the container body 406 should help in maintaining optimum flavor within the tea 604 without causing the ice 606 to melt prematurely.

In step 508 (FIG. 5), the chilling pitcher 404 may be agitated as needed.

Although the present disclosure has been described with reference to specific embodiments, these embodiments are illustrative only and not limiting. Many other applications and embodiments of the present disclosure will be apparent in light of this disclosure and the following claims.

What is claimed is:

1. A brewing assembly comprising:
   a lid ring comprising a sidewall defining a hollow interior, a first end, and an opposed second end;
   a spout having a spout portion extending radially outward from the sidewall at the first end;
   a pitcher having a body with an interior space for holding a liquid, an upper rim with an opening, and an enclosed bottom; the lid ring receiving the upper rim of the pitcher in the hollow interior;
   an infuser suspended by said lid ring and including a well projecting into the interior space of the pitcher and the well comprising a plurality of through holes for fluid to pass thereacross; and
   a cover removably attached to the lid ring to enclose the infuser inside the pitcher to lock in vapor created in the enclosed pitcher.

2. The brewing assembly of claim 1,
   wherein the lid ring further comprises an interior lip; and
   wherein the cover further comprises a cover skirt extending orthogonally from an exterior surface of the cover into the hollow interior of the lid ring through the first end, the cover skirt contacting the interior lip of the lid ring.

3. The brewing assembly of claim 1, wherein the lid ring is removably attached to the upper rim of the body of the pitcher.

4. The brewing assembly of claim 3, wherein the infuser is removable from the interior space of the body of the pitcher after separating the cover from the lid ring.

5. The brewing assembly of claim 4, wherein the lid ring comprises a handle extending from the sidewall of the lid ring.

6. The brewing assembly of claim 4, wherein the cover comprises a rectangular loop cover handle disposed on an external surface of the cover.

7. The brewing assembly of claim 4, wherein the cover skirt comprises external cover threads threadedly engaged with ring threads disposed on the lid ring.

8. The brewing assembly of claim 1, wherein the cover skirt defines a hollowed space, wherein an internal surface of the cover skirt comprises internal cover threads threadedly engaged with threads on an upper rim of the infuser.

9. The brewing assembly of claim 8, wherein the cover comprises external cover threads threaded with ring threads on the lid ring.

10. The brewing assembly of claim 1, wherein the well of the infuser is sized and shaped to have a charge of beverage flavoring material disposed therein.

11. The brewing assembly of claim 9, wherein the lid ring is threadedly attached to external threads on the pitcher.

12. The brewing assembly of claim 1, wherein the lid ring further comprises a gasket located between a lip portion on the lid ring and the upper rim of the pitcher.

13. The brewing assembly of claim 1, wherein the cover further comprises an O-ring for sealing against the lid ring.

14. A brewing assembly comprising:
   a lid ring comprising a sidewall defining a hollow interior, a first end, and an opposed second end;
   a spout having a spout portion extending radially outward from the sidewall at the first end;
   a handle extending from the sidewall of the lid ring, said handle comprising a first handle portion angled from a second handle portion;
   a pitcher having a body with an interior space for holding a liquid, an upper rim with an opening, and an enclosed bottom; the lid ring threadedly receiving the upper rim of the pitcher in the hollow interior;
   an infuser in contact with the lid ring and including a well projecting into the interior space of the pitcher and the well comprising a plurality of through holes for fluid to pass thereacross; and
   a cover having a top and a skirt depending from the top, the cover being removably attached to the lid ring to enclose the infuser inside the pitcher to lock in vapor created in the enclosed pitcher.

15. The brewing assembly of claim 14,
wherein the lid ring further comprises an interior lip; and
wherein the cover further comprises a cover skirt extending orthogonally from an exterior surface of the cover into the hollow interior of the lid ring through the first end, the cover skirt contacting the interior lip of the lid ring.

16. The brewing assembly of claim 14, wherein the lid ring is removably attached to the upper rim of the body of the pitcher.

17. The brewing assembly of claim 16, wherein the infuser is removable from the interior space of the body of the pitcher after separating the cover from the lid ring.

18. The brewing assembly of claim 17, wherein the lid ring comprises a handle extending from the sidewall of the lid ring.

19. The brewing assembly of claim 17, wherein the cover comprises a rectangular loop cover handle disposed on an external surface of the cover.

20. The brewing assembly of claim 17, wherein the cover skirt comprises external cover threads threadedly engaged with ring threads disposed on the lid ring.

21. The brewing assembly of claim 14, wherein the cover skirt defines a hollowed space, wherein an internal surface of the cover skirt comprises internal cover threads threadedly engaged with threads on an upper rim of the infuser.

22. The brewing assembly of claim 14, wherein the well of the infuser is sized and shaped to have a charge of beverage flavoring material disposed therein.

23. The brewing assembly of claim 14, wherein the lid ring further comprises a gasket located between a lip portion on the lid ring and the upper rim of the pitcher.

24. The brewing assembly of claim 14, wherein the cover further comprises an O-ring for sealing against the lid ring.

25. The brewing assembly of claim 14, wherein the infuser is suspended by the lid ring such that a bottom wall of the infuser is spaced from the enclosed bottom of the pitcher.

26. The brewing assembly of claim 14, wherein the infuser is in contact with the cover and the cover is in contact with the lid ring.

27. The brewing assembly of claim 1, wherein the infuser contacts a cover skirt.

28. The brewing assembly of claim 27, wherein the cover skirt contacts the lid ring.

29. A brewing assembly comprising:
a lid ring comprising a sidewall defining a hollow interior, a first end, and an opposed second end;
a handle extending from the sidewall of the lid ring and having a grip part;
a spout having a spout portion extending outwardly from the sidewall of the lid ring at a location closer to the first end than the second end;
a pitcher having a body with an interior space for holding liquid, an upper rim with an opening, and an enclosed bottom; wherein the lid ring receives the upper rim of the pitcher in the hollow interior at the second end;
an infuser comprising a sidewall with an open upper end and a bottom wall defining a well, said well having a plurality of through holes for fluid to pass thereacross and projecting into the interior space of the pitcher while being suspended near the open upper end so that the bottom wall of the well is spaced from the enclosed bottom of the pitcher; and
a cover having a cover skirt projecting into said first end of said lid ring and removably attached to the lid ring in an air tight manner to enclose the infuser inside the pitcher and to lock in vapor created in the enclosed pitcher.

30. The brewing assembly of claim 29, wherein the infuser is removable from the interior space of the body of the pitcher after separating the cover from the lid ring.

31. The brewing assembly of claim 29, wherein the cover comprises a rectangular loop cover handle disposed on an external surface of the cover.

32. The brewing assembly of claim 30, wherein the cover skirt comprises external cover threads threadedly engaged with ring threads disposed on the lid ring.

33. The brewing assembly of claim 29, wherein the cover skirt defines a hollowed space, and wherein an internal surface of the cover skirt comprises internal cover threads threadedly engaged with threads on an upper rim of the infuser.

34. The brewing assembly of claim 30, wherein the lid ring is threadedly attached to external threads on the pitcher.

35. The brewing assembly of claim 29, wherein the lid ring further comprises a gasket located between a lip portion on the lid ring and the upper rim of the pitcher.

36. The brewing assembly of claim 29, wherein the cover further comprises an O-ring for contacting the lid ring.

37. A brewing assembly comprising:
a pitcher having a body with an exterior surface and an interior surface defining an interior space for holding a liquid, an upper rim with an opening, and an enclosed bottom;
a lid ring comprising a sidewall defining a generally cylindrical body with a hollow interior sealingly engaged to the pitcher at the upper rim of the pitcher, said lid ring comprising a first end and an opposed second end;
a cover having a top wall with an exterior surface and an interior surface, said cover being removably and sealingly attached to the lid ring to enclose an infuser inside the pitcher to lock in vapor created in the enclosed pitcher;
a spout having a spout tip located radially outwardly of the exterior surface of the pitcher;
wherein the infuser comprises a sidewall with an open upper end and a bottom wall defining a well, said well having a plurality of through holes for fluid to pass thereacross and projecting into the interior space of the pitcher while being suspended near the open upper end so that the bottom wall of the well is spaced from the enclosed bottom of the pitcher; and
wherein the open upper end of the infuser is spaced from the interior surface of the top wall of the cover.

38. The brewing assembly of claim 37, wherein the lid ring comprises a lip portion and a flange portion defining a space having an 0-ring located therein.

39. The brewing assembly of claim 37, wherein the spout is integrally formed with the lid ring.

40. The brewing assembly of claim 37, further comprising a handle extending from the sidewall of the lid ring.

41. The brewing assembly of claim 37, wherein the cover comprises a skirt and wherein the skirt of the cover projects into the first end of the lid ring.

* * * * *

UNITED STATES PATENT AND TRADEMARK OFFICE
CERTIFICATE OF CORRECTION

| | |
|---|---|
| PATENT NO. | : 10,206,411 B2 |
| APPLICATION NO. | : 15/411881 |
| DATED | : February 19, 2019 |
| INVENTOR(S) | : John M. Lown |

It is certified that error appears in the above-identified patent and that said Letters Patent is hereby corrected as shown below:

In the Specification

In Column 1, Line 62, delete "Figures:" and insert -- figures: --, therefor.

In Column 2, Line 2, after "embodiment;" delete "and".

Signed and Sealed this
Twentieth Day of August, 2019

Andrei Iancu
*Director of the United States Patent and Trademark Office*